May 30, 1933.       V. G. APPLE       1,911,341
DYNAMO ELECTRIC MACHINE ELEMENT
Filed May 5, 1930       2 Sheets-Sheet 1
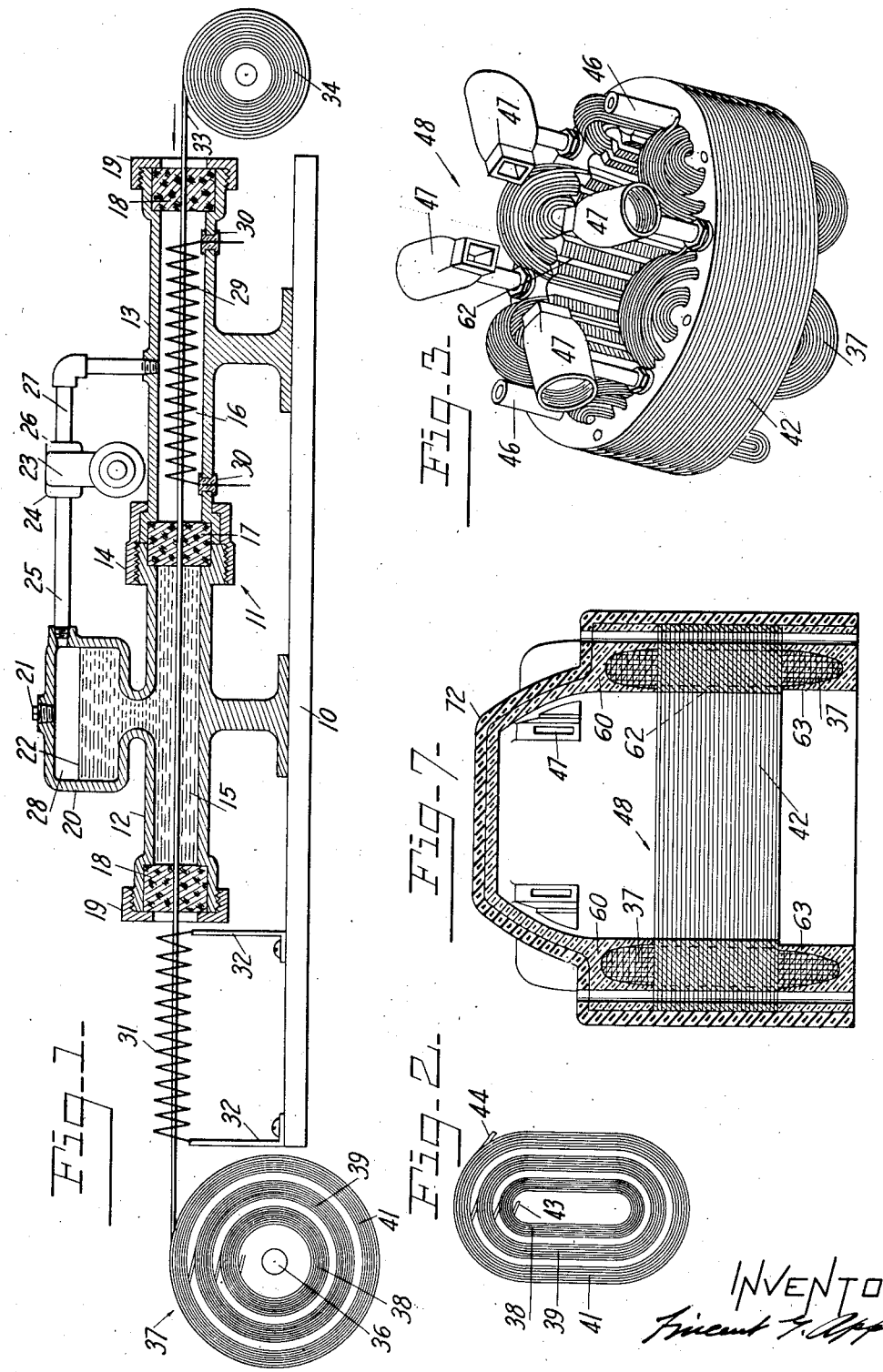

May 30, 1933.  V. G. APPLE  1,911,341
DYNAMO ELECTRIC MACHINE ELEMENT
Filed May 5, 1930    2 Sheets-Sheet 2
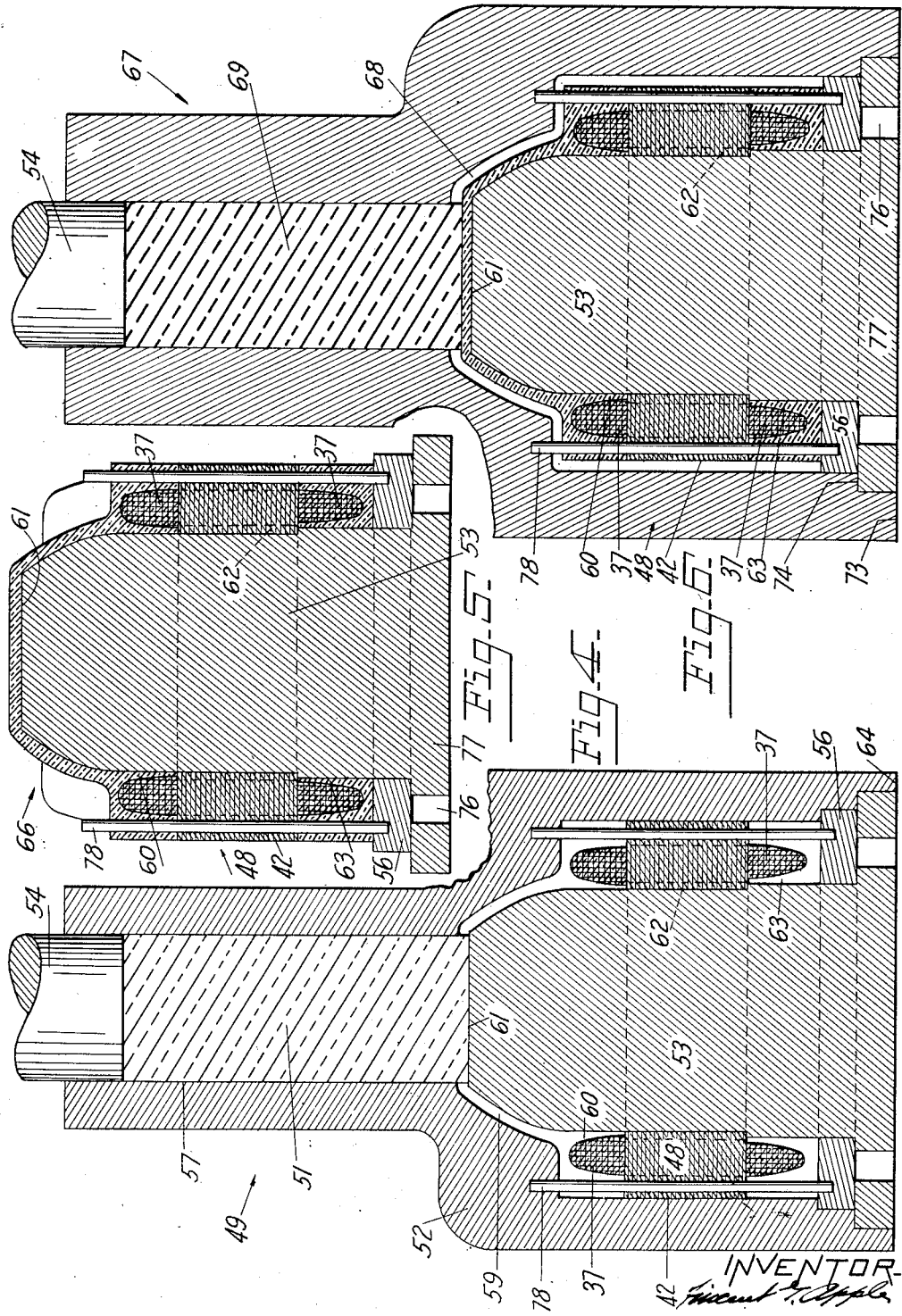

Patented May 30, 1933

1,911,341

UNITED STATES PATENT OFFICE

VINCENT G. APPLE, OF DAYTON, OHIO; HERBERT F. APPLE, EDWARD M. APPLE, AND GOURLEY DARROCH EXECUTORS OF SAID VINCENT G. APPLE, DECEASED

DYNAMO-ELECTRIC MACHINE ELEMENT

Application filed May 5, 1930. Serial No. 450,038.

This invention relates to dynamo electric machine elements and particularly to those comprising a core, a winding, and a mass of insulation which extends through the winding to keep the turns separated, and around it to enclose it and form a housing therefor.

An object of this invention is to provide a structure of this kind wherein the insulation jacket is more durable, of greater strength, and more impervious to moisture and more heat resisting than any heretofore proposed.

Another object is to devise tools and formulate a procedure whereby the first object is carried into effect.

That these and other objects and meritorious features of the invention are attained in the structure and procedure hereinafter disclosed will become apparent to one skilled in the art as the invention is described in detail and reference is made to the drawings, wherein, Fig. 1 is a longitudinal section through a machine which I employ to impregnate the fibrous covering on the magnet wire and wind it into coils.

Fig. 2 is a plan view of a coil after it has been removed from the machine Fig. 1 and slightly reshaped.

Fig. 3 shows a laminated core with a series of coils Fig. 2 in place and connected to appropriate terminals secured to the core.

Fig. 4 shows the wound core Fig. 3 in a mold together with a preformed slug of insulation ready to be fluxed and compressed about the core and coils to cover them and form a housing.

Fig. 5 shows the structure after removal of the upper portion of the mold Fig. 4.

Fig. 6 shows the structure Fig. 5 in a second mold preparatory to having a second layer of different insulation molded thereabout.

Fig. 7 shows the structure after it is removed from mold Fig. 6.

Similar numerals refer to similar parts throughout the several views.

In attempting to produce any wound structure which is both penetrated and covered by a mass of insulation, which also forms the housing about the winding, consideration must be given the following facts, namely:

The most highly penetrative forms of insulation are those that are maintained in liquid form by the addition of solvents.

While these highly penetrative materials are readily forced into the innermost recesses of wound coils, there is great difficulty in forming a jacket of the same material around the coils, since it must be applied to the outside of the coils in a multitude of successive coats, each coat of which must be dried before a succeeding coat may be applied, and this does not result in a final covering of very definite shape.

When a mold is placed around the wound structure and filled with this kind of liquid insulating material considerable time is required to get rid of the solvents, and when they are finally expelled and the mass is hardened, while it retains something of the shape of the mold in which it is formed, it is usually considerably cracked and honeycombed due to the shrinkage caused by the expulsion of the solvents from the mass.

Of the thermoplastic insulating compounds, that is, compounds that are brought to a fluid state by the application of heat, those having the smaller percentage of reinforcing fillers are susceptible of being rendered most fluid and capable of being forced into the smaller crevices, while those having a large percent of fibrous fillers, while molded into small crevices only with extremely high pressure and with great difficulty do nevertheless cure most rapidly and when completed have the greater strength, are more dense, and do not develop cracks or porosity in curing.

There is not available, in the present state of the art, a single insulating compound which has both the penetrative properties of the liquid materials and the rapid curing, density and strength of the fibrous reinforced thermo plastic compounds.

The present process consists of successive steps in which a liquid insulating material having great penetrativeness, but lacking the property of being reduced to a homogeneous mass of definite shape in a mold, is first applied to the winding in such a way that the solvents are readily disposed of, then a layer of thermo plastic material having less penetrativeness and somewhat greater strength is compressed into the remaining voids and in a layer about the coils and hardened, and finally a layer of compound containing a large percent of reinforcing material requiring extremely high pressure to mold may be compressed about the structure.

A conventional procedure most often followed in applying liquid insulation to windings is to wind coils of conductive wire having a covering of more or less porous insulation, usually a fibrous material such as cotton, silk, asbestos, etc. and subsequently immerse the wound coil in a container partly filled with liquid insulating material and then apply pressure to the container to force the liquid to enter the porous covering of the wires and other interstices of the winding.

An objection to this method of insulating coils by impregnation is that often, after a coil is wound, and before it is impregnated with the liquid insulation, there are turns of the wire within the coil which are pressed so closely together, one turn against another, that the fibrous covering is almost, and sometimes quite, cut through, leaving adjacent turns in electrical contact, the condition occurring most frequently of course in a winding such as is employed on an armature, where many of the turns cross, one over the other.

Obviously a sufficiently high pressure may force a liquid insulation to the innermost turns of the wound coil, but there is no reason to believe that any amount of pressure on the container will force the liquid to enter and spread apart those turns which are already in too intimate contact.

Another objection to the method of insulating wound devices by impregnation, is that in a great many cases the coils must be wound directly on the core, so that when afterward the coils are to be impregnated, the entire structure comprising the core, the coils and their terminals is necessarily immersed in the liquid insulation.

Now this would involve no great hardship in the case of a simple coil, but in a more complex structure, such for instance as the dynamo electric machine field elements which I have selected to illustrate my invention, the liquid would cover the binding posts and brush terminals, would enter the central bore which must afterward clear an armature, and would penetrate and fill the bolt holes which extend longitudinally through the core, and while tools may be made to exclude the insulation from these parts while impregnation is being effected, there is afterward substantially as great difficulty in removing the surplus insulation from these tools as there would have been in removing it from the surfaces and holes of the wound element protected by them, for it is a well known fact that some of the best known liquid insulating materials have also the greatest adhesive properties.

Because it overcomes the foregoing and many other objections to the conventional method of impregnating windings, the hereinafter described procedure is followed in applying the liquid insulation as a first step in the present invention.

The coating apparatus Fig. 1 has a base 10 upon which is mounted a tubular body 11, divided near its middle into two parts 12 and 13, the parts being held together by a threaded sleeve 14.

Body 11 is hollow, the space within being divided into two chambers 15 and 16 separated by a plug 17, which may be inserted and removed when the two parts 12 and 13 are separated by the removal of sleeve 14.

Plugs 18, held in place by screw caps 19, close the outer ends of chambers 15 and 16. Both plugs 18 as well as plug 17 have holes, extending longitudinally therethrough, of a diameter equal to that of the wire to be coated. These plugs are preferably made from a material of a more or less yielding nature so as to permit the passage of a knot or a splice without undue strain on the wire. Cork has been found to be satisfactory both as to yielding quality and as to wear, although a soft rubber plug having a small longitudinally split metal bushing imbedded at its center is equally desirable.

A tank 20 extends from body part 12 and communicates with chamber 15. Upon removal of filler plug 21 the tank may be partly filled with liquid insulation 22 as shown. An air pump 23 has its discharge valve 24 connected by pipe 25 to tank 20 and its suction valve 26 connected by pipe 27 to chamber 16. The pump 23 is operated to create a partial vacuum in chamber 16 and pressure in the space 28 above the liquid 22 in tank 20.

A coil 29 of electrical resistance wire is suspended within, but does not touch chamber 16. The ends of coil 29 are brought out through insulating bushings 30 as shown. A second coil 31 is supported on metal brackets 32 extending from base 10. An electric current is made to flow through coils 29 and 31 when wire is being coated.

Magnet wire 33 comprising conductive wire covered with a thin layer of cotton or similar absorbent material is drawn from its spool 34 through one plug 18 into vacuum chamber 16 through coil 29 out of chamber 16 through plug 17 into the liquid insulation 22 in chamber 15 and out through the other plug 18 and coil 31.

When the wire 33 enters chamber 16, the partial vacuum, together with the heat generated by resistance coil 29, takes whatever moisture there may be from the porous cover, so that it enters chamber 15 dry, and with the pores of the fibrous covering under partial vacuum, and inasmuch as liquid 22 is under pressure it more readily penetrates all of the pores of the fibrous covering.

As the wire emerges from chamber 15 through plug 18 the surplus liquid is stripped off and retained in the chamber and the coating is given a definite size, depending of course on the accuracy maintained in the opening through plug 18. As the wire passes through heating coils 31, the solvent contained in the liquid insulation is expelled, the heat of the coil 31 being so regulated that the coating on the wire is still sufficiently pliable to wind into the coil.

The spindle 36 may be revolved by any convenient method to wind the coil 37, which in the instant case is wound round and in three interconnected sections 38, 39 and 41, and afterward removed from the spindle and drawn out to the oblong shape shown in Fig. 2, which adapts it to the slotted core 42, Fig. 3, which I use for the field element herein selected for illustration, the beginning 43 of the inner section 38 being adapted to connect to one of the line terminals, and the end 44 of the outer section 39 being adapted to connect to one of the brush terminals.

Fig. 3 shows the field core 42 with six of the insulation treated coils 37 in place. Line terminals 46 and brush terminals 47 are insulated from the core though secured thereto by screws which pass through insulation lined holes in the core. The proper coil ends are electrically joined to terminals 46 and 47 in any conventional manner. The structure comprising core 42, coils 37, line terminals 46 and brush terminals 47 designated as a whole by numeral 48, is now baked until the insulation is completely hardened after which it is capable of withstanding the pressure incident to molding some of the more easily molded thermo plastic insulating materials into the remaining crevices in the coils and forming a housing about them which will withstand further and higher pressures.

The mold 49, Fig. 4, is shown with the structure 48 in place together with a preformed slug 51 of thermo plastic insulation of the kind which, though easily molded, does not possess the greatest strength or density such for instance as a mixture of three-fourths synthetic resin and one-fourth wood flour. The principal parts of the mold 49 are the body 52, the center plug 53, the plunger 54 and the stripper plate 56.

It will be seen that the stock chamber 57 shown with plunger 54 slightly entered, is in effect separate from the molding chamber 59, which is to form the jacket around the winding, and that the upper end 61 of center plug 53 in effect forms a bottom for the stock chamber 57, so that movement of moldable material from the stock chamber 57 into the molding chamber 59 must be laterally of the movement of the plunger which forces the material out of the stock chamber into the molding chamber.

The reason for so constructing the mold will be apparent from the manner of using it, which consists briefly of placing the structure in the mold, heating the mold to a relatively high temperature, placing a measured quantity of the compound under the plunger, putting pressure on the plunger to force the unfluxed compound against the upper surface 61 of center plug 53, maintaining the pressure until the compound absorbs sufficient heat from the mold to become fluid and so flow laterally from under the plunger into the molding chamber 59 and there be compressed hydraulically about the coils at 60 and to the contour of the interior 59 of the molding chamber, downwardly through the unfilled portions 62 (see also Fig. 3) of the winding apertures to surround the lower end of the coils at 63 then allowing it to be hardened from the heat remaining in the mold.

Because of the absence of any considerable quantity of reinforcing filler in the insulation composing the slug 51 it becomes highly fluid and because of the manner in which the molding pressure comes on the winding, that is, substantially equal in all directions thereon, very little distortion of the coils results, and, because of the manner in which the individual turns of the winding are insulated, no ill effect results from such distortion of the coils as may occur.

When the insulation in the mold 49 is hardened the body 52 is held at its outer edge at 64 and by vertical pressure on plunger 54 the insulated jacketed field element 66, Fig. 5, is ejected from the mold body 52, still retaining the center plug 53 and the stripper plate 56. In this condition, and without removing plug 53 and plate 56 the structure is placed in a mold body 67 (Fig. 6) having space 68 entirely surrounding the outer exposed surface of the field element.

After the mold is brought to a proper temperature a preformed slug 69 of molding compound of that class carrying a large percentage of reinforcing filler and consequently requiring extremely high pressure to cause it to flow, such as a mixture of sixty per cent asbestos fibre and forty per cent synthetic resin, or the commercial chopped rag and synthetic resin mixture, is put in the stock chamber 71, the plunger 54 is entered and when slug 69, by absorption of heat, has reached its most mobile state the plunger is forced downward compressing the insulation into the space 68 completely covering the outer exposed surface of the field element with the layer 72 of reinforced insulation (see Fig. 7).

After layer 72 has been hardened the mold body 67 is held at its edge 73 and, by downward pressure on plunger 54 the completed field element together with plug 53 and stripper plate 56 is ejected. The structure is then inverted and by holding plug 53 at the edge 74 and pushing through the openings 76 in the base 77 of the plug the field element is stripped from the plug. Pins 78 are finally pushed out to leave holes through the field for bolts by which any suitable closure is held to the open end of the field.

From the foregoing description taken in conjunction with the drawings it will be seen that the completed field element comprises a substantially continuous and solid mass of insulation extending from the innermost turns of the winding to the outer surfaces of the structure. This is important from the standpoint of dissipating the heat generated within the winding since a substantially continuous path for the conduction of heat is provided and the heat will be carried away much more rapidly than when a more or less cellular material surrounds or penetrates the coils or where there are intervening air spaces between the winding and the outer surfaces of the structure.

It will also be seen that the mass of insulation which penetrates the winding, surrounds it, and forms the housing is of a varying nature in its different layers having the greatest strength and density where strength and density are required and the greatest penetrativeness where the greatest penetrativeness is required.

Referring to the process outlined it will be seen that the foregoing results could not have been obtained by forming the entire mass of insulation in a mold from the highly penetrative material used within the winding, since such material becomes cellular when hardened, nor could it have been obtained by employing for the entire mass the kind of insulation used in the intermediate layer, since without the resistance which was built into the coils by the first operation the winding would be crushed even by the more mobile thermo plastic compound employed for the intermediate layer, nor could the outer layer have been molded directly over the winding even after it had received the hardening treatment of the first operation, since sufficient resistance cannot be thus put into the winding to withstand the molding pressure necessary to compress the less mobile reinforced thermo plastic material of the outer layer.

It is only by building up the compressive strength of the structure by the successive step outlined that the resulting mass of insulation may be such as to penetrate the coils, cover them, and yet form the strong impenetrable housing herein achieved. While in Fig. 1 of the drawings, and in lines 6, page 5, to line 27, page 6, of the specification I show and describe a method of insulating a wire and apparatus for carrying out the method, I do not herein claim the method nor the apparatus, the same being shown, described and claimed in my copending application Serial Number 356,586, filed April 19th, 1929, and while in Fig. 4 of the drawings and on page 8 of the specification I show and describe a method of molding a layer of insulation about the coils of a dynamo electric machine, I do not herein claim this method nor the apparatus broadly, the same being shown, described and claimed in my copending application Serial Number 262,460, filed March 17th, 1928. What I do claim in the present application is the method and the apparatus indicated in the copending applications when combined with additional steps and additional apparatus to produce a new and different product. Accordingly,

I claim,

1. An electrical device comprising a winding and a mass of molded insulation penetrating, surrounding and completely enclosing said winding, said mass being reinforced by a filler of fibrous material, said filler being unequally distributed throughout said mass, the portion of said mass penetrating said coil containing none of the fibrous filler, the portion of said mass immediately surrounding said coil containing a small part of said fibrous filler, and the portion of said mass forming the outer surface containing the greater part of said fibrous filler.

2. The method of making an electro-magnetic device comprising a magnetizable core, a fragile winding of wire having a covering of fibrous insulation on said core and a mass of molded insulation penetrating and surrounding said winding and said core, which consists of impregnating and coating the fibrous covering on the winding with a liquid insulation, winding the wire into coils, placing the coils on the core, hardening said coils, placing the assembled core and coils in a mold, molding a layer of highly plastic insulation about the coils by moderate pressure, hardening said layer, then molding a second layer of semi-plastic insulation by higher pressure about the first layer and about said core.

3. An electrical device comprising a winding hermetically sealed in a mass of molded insulation with a fibrous reinforcing material unequally distributed throughout the mass, the greater portion of said reinforcing material being concentrated near the outer surface.

4. An electrical device comprising a winding and a mass of molded insulation penetrating, surrounding and hermetically sealing in said winding, said mass comprising synthetic resin, with fibrous reinforcing filler unequally distributed throughout, the portion of the mass immediately surrounding the winding containing from twenty-five to fifty per cent of wood flour and the outer surface of the mass containing over fifty per cent of asbestos fibre.

5. The structure defined in claim 4 but wherein chopped rags are substituted for the asbestos fibre.

6. The method of making the structure defined in claim 3, which consists of fortifying the winding against distortion by interposing a liquid insulating cement between the individual turns of the coil, hardening said cement, then molding layers of insulating materials around the hardened structure, and increasing the percentage of fibrous reinforcing material in each succeeding layer.

7. The method of encasing and hermetically sealing an electrical coil in a body of insulation reinforced with a fibrous filler, with the greater portion of the filler concentrated at the outer surface of the said body, which consists of reinforcing the coil by interposing layers of insulating cement between the individual turns, hardening said cement, then molding layers of synthetic resin containing a fibrous filler around the hardened coil, and progressively increasing the amount of fibrous filler introduced into said resin at each succeeding layer.

In testimony whereof I affix my signature.

VINCENT G. APPLE.